US011890994B2

(12) United States Patent
Otake et al.

(10) Patent No.: US 11,890,994 B2
(45) Date of Patent: Feb. 6, 2024

(54) ON-BOARD BRACKET FOR ON-BOARD DEVICE AT VEHICLE

(71) Applicant: NIFCO INC., Yokosuka (JP)

(72) Inventors: Takanori Otake, Yokosuka (JP); Shohei Seko, Atsugi (JP); Hideaki Hashimoto, Atsugi (JP)

(73) Assignee: NIFCO INC., Yokosuka (JP)

( * ) Notice: Subject to any disclaimer, the term of this patent is extended or adjusted under 35 U.S.C. 154(b) by 283 days.

(21) Appl. No.: 17/331,881

(22) Filed: May 27, 2021

(65) Prior Publication Data

US 2021/0380047 A1    Dec. 9, 2021

(30) Foreign Application Priority Data

Jun. 3, 2020    (JP) .................................. 2020-96720

(51) Int. Cl.
| | |
|---|---|
| *B60R 11/04* | (2006.01) |
| *G06V 20/56* | (2022.01) |
| *H04N 23/52* | (2023.01) |
| *G03B 17/56* | (2021.01) |
| *F16M 11/10* | (2006.01) |

(Continued)

(52) U.S. Cl.
CPC ............. *B60R 11/04* (2013.01); *F16M 11/04* (2013.01); *F16M 11/10* (2013.01); *F16M 11/12* (2013.01); *F16M 11/18* (2013.01); *G03B 17/56* (2013.01); *G06V 20/56* (2022.01); *H04N 23/52* (2023.01); *B60R 2011/0026* (2013.01)

(58) Field of Classification Search
CPC . B60R 11/04; B60R 2011/0026; G06V 20/56; H04N 23/52; G03B 17/56; F16M 11/04; F16M 11/12; F16M 11/10; F16M 11/18

USPC ......................................................... 396/428
See application file for complete search history.

(56) References Cited

U.S. PATENT DOCUMENTS 7,657,052 B2 *   2/2010   Larson ...................... H04R 3/00
                                                    381/361
8,414,137 B2 *   4/2013   Quinn ....................... B60R 1/04
                                                    359/871

(Continued)

FOREIGN PATENT DOCUMENTS

| CN | 113752954 A | * | 12/2021 | ............. B60R 11/04 |
| EP | 2965949 A1 | * | 1/2016 | ............. B60R 11/00 |

(Continued)

OTHER PUBLICATIONS

Japanese Office Action dated Aug. 1, 2023 in Japanese Application No. 2020-096720.

*Primary Examiner* — Stephanie E Bloss
*Assistant Examiner* — Kevin C Butler
(74) *Attorney, Agent, or Firm* — Sughrue Mion, PLLC

(57) ABSTRACT

There is provided an on-board-device bracket capable of appropriately mounting a front portion of an imaging means with respect to a windshield. An on-board-device bracket 10 is formed by a bracket body portion 11 and a front portion 16 connected to a front part of a center portion of the bracket body portion 11. Slits 17 along the front portion 16 are formed between the front portion 16 and the bracket body portion 11. The front portion 16 includes, at the front end thereof, a front bonding portion. The front portion 16 is bent by the slits 17 individually from the bracket body portion 11 and displaced with respect to a windshield 1.

16 Claims, 5 Drawing Sheets

(51) Int. Cl.
*F16M 11/18* (2006.01)
*F16M 11/04* (2006.01)
*F16M 11/12* (2006.01)
*B60R 11/00* (2006.01)

(56) References Cited

U.S. PATENT DOCUMENTS

| | | | | |
|---|---|---|---|---|
| 8,488,818 | B2* | 7/2013 | Biggs | H04R 1/021 |
| | | | | 381/86 |
| 10,266,118 | B2* | 4/2019 | Watson | B60R 1/04 |
| 10,363,872 | B2* | 7/2019 | Kubota | B60R 1/00 |
| 10,967,901 | B2* | 4/2021 | Nagai | B60R 13/0256 |
| 10,970,562 | B2* | 4/2021 | Michiguchi | H04N 7/181 |
| 2005/0001901 | A1* | 1/2005 | Eggers | B60R 11/04 |
| | | | | 348/118 |
| 2011/0176689 | A1* | 7/2011 | Biggs | H04R 1/021 |
| | | | | 381/86 |
| 2016/0009230 | A1 | 1/2016 | Miyado et al. | |
| 2016/0162740 | A1* | 6/2016 | Takemura | G06V 20/56 |
| | | | | 348/148 |
| 2017/0210303 | A1* | 7/2017 | Luis y Prado | H04N 7/183 |
| 2019/0168671 | A1* | 6/2019 | Higashimachi | B60R 1/12 |
| 2019/0283794 | A1* | 9/2019 | Nagai | B60R 13/0256 |
| 2019/0375344 | A1 | 12/2019 | Kobayashi | |
| 2021/0380047 | A1* | 12/2021 | Otake | B60R 11/04 |

FOREIGN PATENT DOCUMENTS

| | | | | | |
|---|---|---|---|---|---|
| JP | 8-292724 | A | | 11/1996 | |
| JP | 2001-107943 | A | | 4/2001 | |
| JP | 2002-187490 | A | | 7/2002 | |
| JP | 2006281966 | A | * | 10/2006 | |
| JP | 2010058602 | A | * | 3/2010 | |
| JP | 2012201198 | A | * | 10/2012 | |
| JP | 2016-16830 | A | | 2/2016 | |
| JP | 2016060278 | A | * | 4/2016 | |
| JP | 2017-71335 | A | | 4/2017 | |
| JP | 2017137022 | A | * | 8/2017 | |
| JP | 2018-16199 | A | | 2/2018 | |
| JP | 2018016199 | A | * | 2/2018 | |
| JP | 6624509 | B2 | * | 12/2019 | |
| JP | 6796192 | B2 | * | 12/2020 | B60R 11/04 |
| KR | 20200134366 | A | * | 12/2020 | B60R 13/0206 |
| KR | 200496491 | Y1 | * | 4/2022 | B60R 11/00 |
| WO | WO-2018190116 | A1 | * | 10/2018 | B60R 11/04 |

* cited by examiner

ON-BOARD BRACKET FOR ON-BOARD DEVICE AT VEHICLE

BACKGROUND OF THE INVENTION

1. Field of the Invention

The present invention relates to an on-board-device bracket for installing an on-board device in a vehicle.

Conventionally, an on-board device, such as a camera, is installed in an automobile, and such an on-board device is mounted, mainly, to the inner surface of a windshield. As a structure for mounting an on-board device to a windshield, there is, for example, a bracket mounting structure (hereinafter referred to as "literature publicly-known invention") for a vehicular auxiliary device described in Patent Literature 1 presented below. The literature publicly-known invention includes a screw-shaped bracket mount portion to be attached to a windshield, and a flat plate-shaped bracket to be mounted to the bracket mount portion. At the bracket, there are formed, in addition to a fastened portion to be fastened to the bracket mount portion, a fixing portion to which a camera is to be mounted, an engagement portion to which a cover member that covers the camera is to be mounted, and the like. The fixing portion has a shape that bulges toward the vehicle interior in a direction away from the inner surface of a windshield.

2. Description of the Related Art

PLT

Japanese Unexamined Patent Application Publication No. 2018-16199

SUMMARY OF THE INVENTION

However, in general, there is a case in which it is not possible, due to factors (hereinafter referred to as "inappropriate factors") including deformation and dimensional variation due to a curve of a bracket, a warp of a windshield, and the like to appropriately mount the bracket with respect to the windshield. In particular, from the point of view of securing ventilation for mist prevention, a gap as a ventilation passage is required to be appropriately provided between a front portion ("fixing portion" in the literature publicly-known invention) of a camera lens and a windshield. When it is not possible to appropriately mount the bracket with respect to the windshield, the gap as a ventilation passage is also not possible to be appropriate.

The present invention has been proposed in consideration of the aforementioned circumstances. That is, an object of the present invention is to provide an on-board-device bracket capable of appropriately mounting a front portion of an imaging means with respect to a windshield.

To achieve the aforementioned object, the on-board-device bracket according to the present invention is an on-board-device bracket for installing an on-board device at a windshield of an automobile. The on-board-device bracket is characterized by including a bracket body portion including a body bonding portion that is to be bonded to the windshield, and a front portion that is connected to the bracket body portion and that is disposed on a front side of an imaging means that is the on-board device. A relative displacement means that displaces the front portion individually from the bracket body portion is formed along the front portion from a front end of the front portion. The front portion includes, at the front end thereof, a front bonding portion that is to be bonded to the windshield.

The on-board-device bracket according to the present invention is characterized in that the relative displacement means is a slit.

The on-board-device bracket according to the present invention is characterized in that the relative displacement means is disposed on left and right sides of the front portion.

The on-board-device bracket according to the present invention is characterized in that a cover mount portion to which a cover that covers the on-board device is to be mounted is formed at the bracket body portion.

The on-board-device bracket according to the present invention is characterized in that the relative displacement means is formed left-right symmetrically, and the cover mount portion is formed left-right symmetrically.

The on-board-device bracket according to the present invention is characterized in that the on-board-device bracket has a plate shape, and, at the bracket body portion, a camera mount portion to which a video camera that is the imaging means is to be mounted, a detection-means mount portion disposed on left and right sides of the camera mount portion and to which an environment detection means that is the on-board device is to be mounted, and a cover mount portion disposed near the detection-means mount portion and to which a cover that covers the on-board device is to be mounted are formed, the front portion being connected to a front part of the bracket body portion, being formed in a concave shape that provides a gap between the front portion and the windshield, and having the front bonding portion at left and right both ends of the front end, the relative displacement means being formed between the front bonding portion and the cover mount portion to extend from the front end toward the camera mount portion.

The on-board-device bracket according to the present invention includes the bracket body portion including the body bonding portion that is to be bonded to the windshield, and the front portion that is connected to the bracket body portion and that is disposed on the front side of the imaging means that is the on-board device. The relative displacement means that displaces the front portion individually from the bracket body portion is formed along the front portion from the front end of the front portion. The front portion includes, at the front end thereof, the front bonding portion that is to be bonded to the windshield. With this configuration, the front portion is demarcated from the bracket body portion with the relative displacement means interposed therebetween and is displaced with respect to the windshield, when bonded to the windshield, independently from the displacement of the bracket body portion with respect to the windshield. That is, the front portion is displaced without depending on the displacement of the bracket body portion and thus can flexibly respond to inappropriate factors. In addition, since the front portion is provided with the front bonding portion, the front portion is bonded to the windshield independently from the bonding of the bracket body portion to the windshield. Consequently, it is possible to appropriately mount the front portion with respect to the windshield.

In the on-board-device bracket according to the present invention, the relative displacement means is the slit. That is, the front portion is partially separated by the slit from the bracket body portion and is independently displaced with respect to the windshield. Consequently, it is possible to reliably and appropriately mount the front portion with respect to the windshield with a simple configuration.

In the on-board-device bracket according to the present invention, the relative displacement means is disposed on the left and right sides of the front portion. With this configuration, the front portion is reliably separated with respect to the bracket body portion even if the bracket body portion is large. Consequently, it is possible to reliably and appropriately mount the front portion with respect to the windshield.

In the on-board-device bracket according to the present invention, the cover mount portion to which the cover that covers the on-board device is to be mounted is formed at the bracket body portion. With this configuration, the cover is mounted to the bracket body portion and is not mounted to the front portion. That is, the front portion is independent not only from the bracket body portion but also from the cover. The front portion is thus displaced without depending on the displacement of the bracket body portion even when covered by the cover. Consequently, it is possible to appropriately mount the front portion with respect to the windshield. In addition, in other words, the bracket body portion is also displaced without depending on the displacement of the front portion, it is thus possible to appropriately mount the bracket body portion with respect to the windshield. When the orientation of the bracket body portion is appropriate, the orientation of the cover mounted thereto is also appropriate. Consequently, the camera lens is appropriately covered by the cover, and it is possible to suppress the influence of reflection and the like with respect to the camera lens.

In the on-board-device bracket according to the present invention, the relative displacement means is formed left-right symmetrically, and the cover mount portion is formed left-right symmetrically. Consequently, it is possible to displace the front portion independently from the bracket body portion and appropriately mount the front portion with respect to the windshield.

The on-board-device bracket according to the present invention has a plate shape. At the bracket body portion, the camera mount portion to which the video camera that is the imaging means is to be mounted, a detection-means mount portion disposed on the left and right sides of the camera mount portion and to which the environment detection means that is the on-board device is to be mounted, and a cover mount portion disposed near the detection-means mount portion and to which the cover that covers the on-board device is to be mounted are formed. The front portion is connected to the front part of the bracket body portion, is formed in the concave shape that provides the gap between the front portion and the windshield, and has the front bonding portion at the left and right both ends of the front end. The relative displacement means is formed between the front bonding portion and the cover mount portion to extend from the front end toward the camera mount portion. Consequently, it is possible to displace the front portion independently from the bracket body portion and appropriately mount the front portion with respect to the windshield. In addition, on-board devices of a plurality of types are supported by the bracket in common, and it is possible to mount on-board devices of a plurality of types to the windshield with a single member.

DESCRIPTION OF PREFERRED EMBODIMENT

Figure 1:
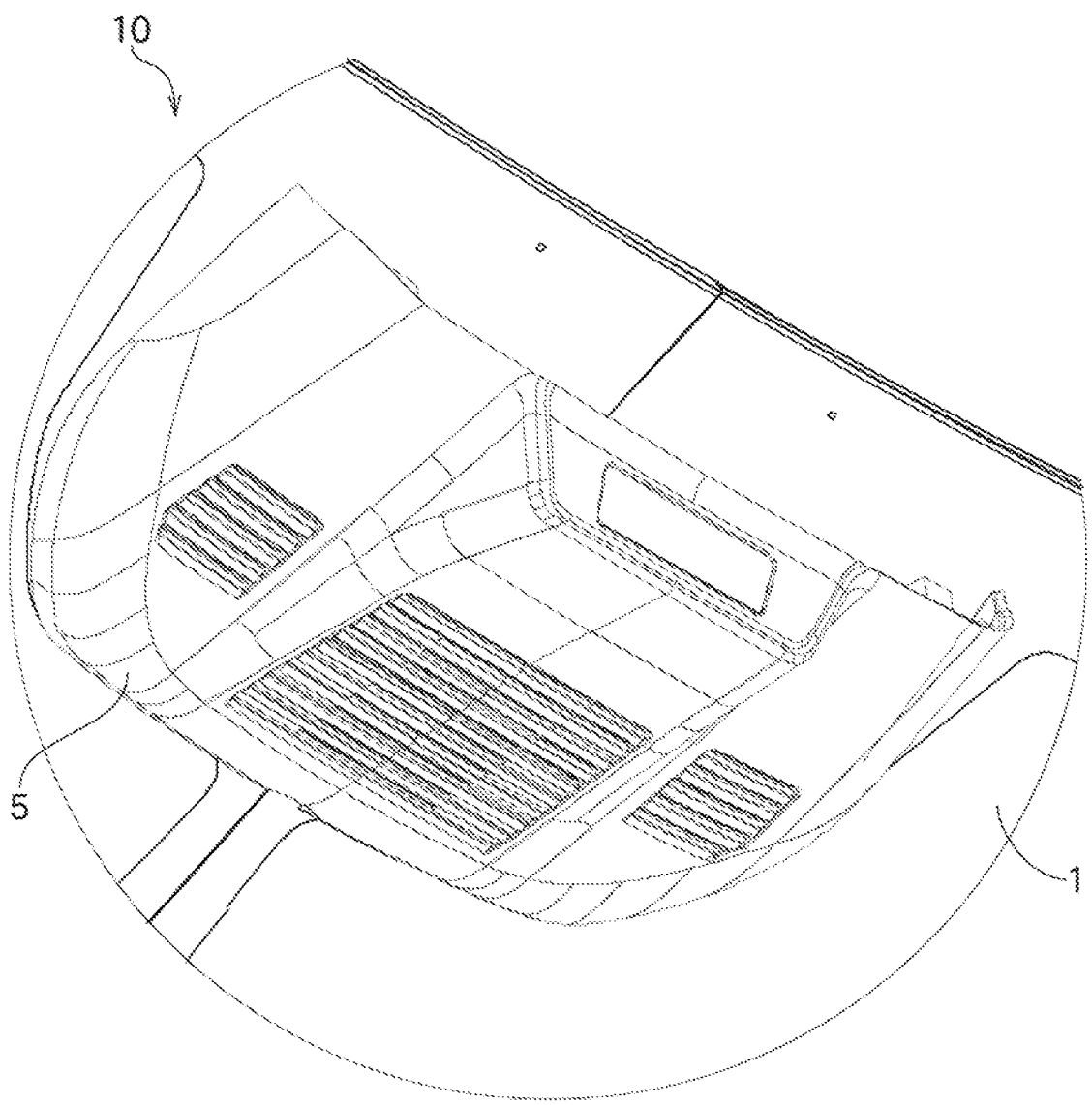
FIG. 1 is a perspective view of a use state of an on-board-device bracket according to an embodiment of the present invention with a cover mounted thereto.
Figure 2:
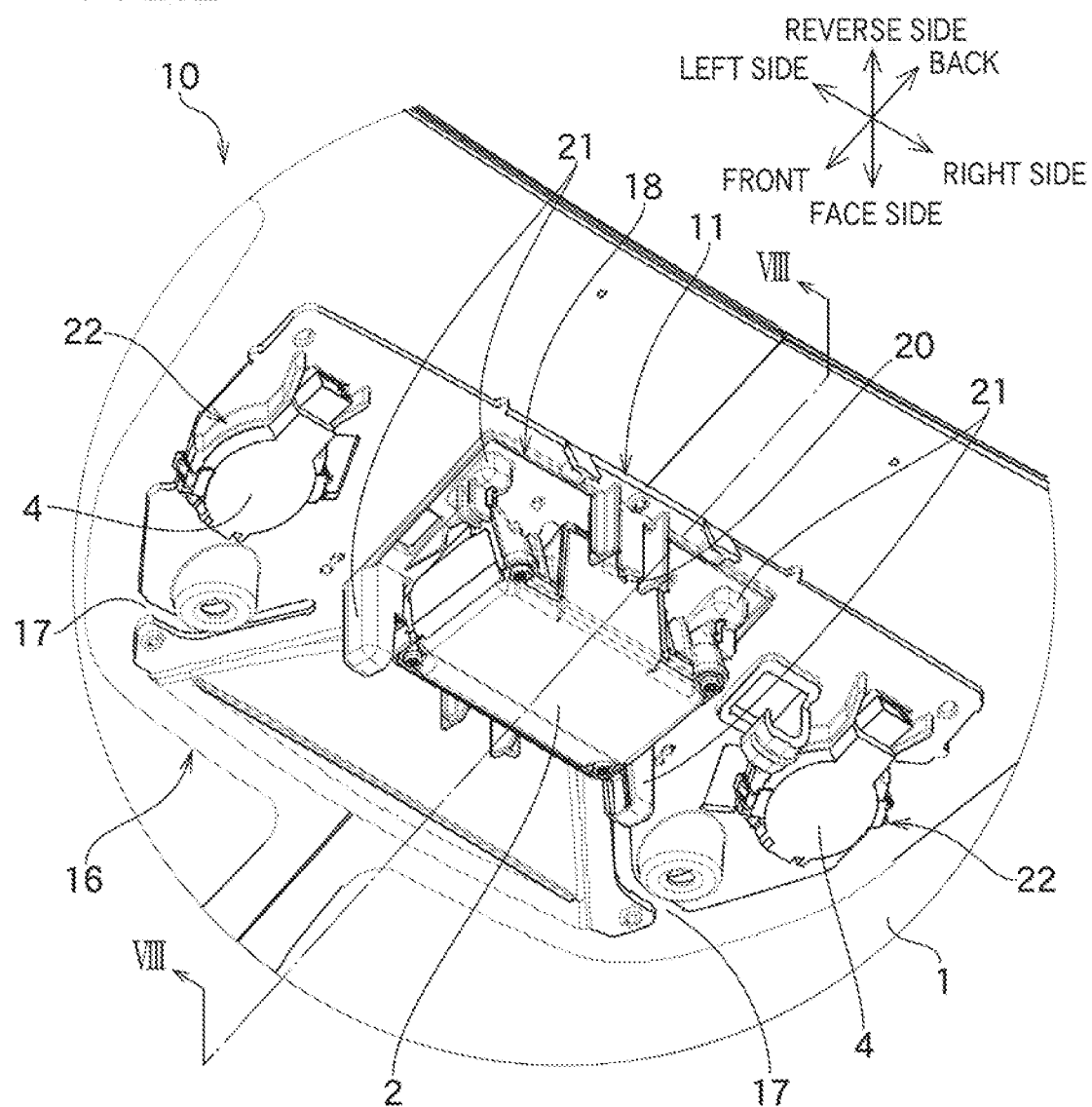
FIG. 2 is a perspective view of a use state of the on-board-device bracket according to an embodiment of the present invention.

Hereinafter, an on-board-device bracket according to an embodiment of the present invention will be described on the basis of the drawings. In FIGS. 1 and 2, an on-board-device bracket 10 when a windshield 1 is viewed from below at a left seat (not illustrated) in a vehicle is illustrated. In FIG. 1, the on-board-device bracket 10 with a cover 5 mounted thereto is illustrated. In FIG. 2, the on-board-device bracket 10 with the cover 5 dismounted therefrom is illustrated.

As illustrated in FIGS. 1 and 2, the on-board-device bracket 10 is used, for example, when on-board devices such as a camera and a video camera 2 as imaging means and a rain sensor 4 as an environment detection means are to be installed in a vehicle, to mount these on-board devices at the inner surface of the windshield 1. At the windshield 1, the on-board-device bracket 10 is disposed, for example, near a rear-view mirror (not illustrated). The cover 5 that covers the on-board devices is attached to or detached from the on-board-device bracket 10. Note that, as illustrated in FIG. 2, in the following description, a direction toward the windshield 1 as viewed from the vehicle interior (or a direction toward an instrument panel along the windshield 1) is the front direction (Front), a direction away from the windshield 1 (or a direction toward a roof panel along the windshield 1) is the back direction (Back), the width direction of the windshield 1 is the left-right direction (Left Side, Right Side), a side to be bonded to the windshield 1 is the reverse side (Reverse Side), and a side at which an on-board device is to be mounted is the face side (Face Side).

Here, the on-board-device bracket 10 will be described in detail on the basis of the drawings. In FIGS. 3 to 7, an external appearance and sections of the on-board-device bracket 10 are illustrated.

As illustrated in FIGS. 3 to 7, the on-board-device bracket 10 formed in a plate shape is formed by a bracket body portion 11 and a front portion 16 connected to a front part of the bracket body portion 11. The bracket body portion 11 includes a center portion 13, and a left portion 14 and a right portion 15 that are connected to the left and right of the center portion 13 while the front portion 16 is connected to a front part of the center portion 13. A left-right pair of slits 17 as a relative displacement means is formed, around the front portion 16, between the front portion 16 and the bracket body portion 11. The slits 17 are formed along the front portion 16 to extend from the front end of the on-board-device bracket 10 toward the center portion 13 and in a direction in which the slits 17 approach each other. Since the on-board-device bracket 10 is made of a resin, the bracket body portion 11 and the front portion 16 are bent by the slits 17 individually and displaced with respect to the windshield 1. A plurality of body bonding portions 12 that is to be bonded to the windshield 1 is formed at the reverse surface of the bracket body portion 11 while a plurality of mount portions to which an on-board device is to be mounted is formed at the face of the bracket body portion 11. Note that the arrangement of the body bonding portions 12 is an optional location between the mount portions.

A camera mount portion 18 to which the video camera 2 is to be mounted is formed at the center portion 13. The camera mount portion 18 is demarcated in a substantially quadrangular shape. Around the center of the camera mount portion 18, a lens opening portion 19 at which a camera lens 3 (refer to FIG. 8) is to be disposed is formed, and a plate spring portion 20 that supports the video camera 2 at a back part of the camera mount portion 18 and a plurality of support portions 21 that supports the video camera 2 at left and right parts and a front part project downward.

A detection-means mount portion 22 to which the rain sensor 4 is to be mounted is formed at each of the left and right portions 14 and 15. In each of the left and right detection-means mount portions 22, a detector opening portion 23 is formed, and a projecting edge portion 24 that projects downward is formed at each of the left and right edges of the detector opening portions 23. A wire arrangement portion 25 is formed near the detection-means mount portion 22 of the right portion 15. A cover mount portion 26 to which the cover 5 is to be mounted is formed on the front side of each of the left and right detection-means mount portions 22. The cover mount portions 26 are each disposed at a front part of each of the left and right portions 14 and 15 and project downward. Note that, in other embodiments, the wire arrangement portion is disposed near the left portion or in an optional location. In other embodiments, the cover mount portions are each disposed in an optional location.

The front portion 16 has a triangular shape or a fan shape gradually extending to the left and the right from the center portion 13 toward the front side and is formed in a concave shape that provides a gap between the front portion 16 and the windshield 1. That is, in contrast to the bracket body portion 11 that is to be bonded to the windshield 1 almost without a gap, the front portion 16 is separated from the windshield 1. The front portion 16 includes a communication port portion 27 in communication with the lens opening portion 19 of the bracket body portion 11, a gap formation plate 28 on the front side of the communication port portion 27 and approaching the windshield 1 gradually toward the front end, a step portion 29 that is a step between the bracket body portion 11 and left and right both sides of the gap formation plate 28, and front bonding portions 30 that are left and right both ends of the front end.

The front bonding portion 30 and the cover mount portion 26 of the bracket body portion 11 are disposed adjacent to each other in the front-back direction. The front bonding portions 30 and the cover mount portion 26 are, however, separated from each other with the slits 17 interposed therebetween, the slits 17 being formed between the front bonding portions 30 and the cover mount portion 26 to extend from the front end along the step portion 29 toward the camera mount portion 18.

In the on-board-device bracket 10 formed as described above, the center portion 13, the camera mount portion 18 (the lens opening portion 19, the plate spring portion 20, and the support portions 21), the cover mount portion 26, the front portion 16 (the communication port portion 27, the gap formation plate 28, the step portion 29, and the front bonding portions 30), and the slits 17 are substantially left-right symmetrical with respect to a center line.

Figure 8:
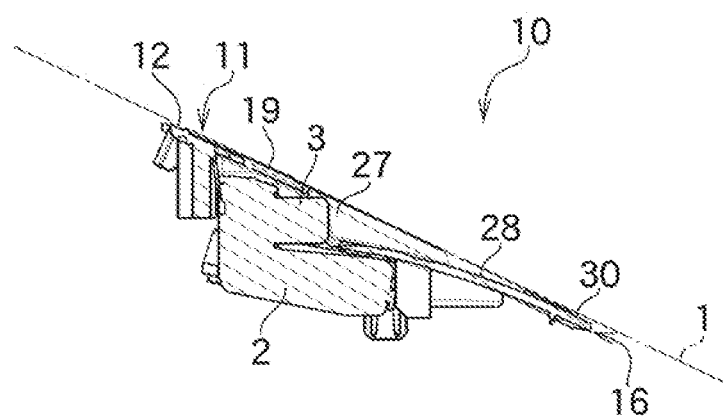
FIG. 8 is a section taken along line VIII-VIII of FIG. 2 and is a side sectional view of a use state of the on-board-device bracket according to an embodiment of the present invention.

Next, a use example of the on-board-device bracket 10 will be described based on the drawings. In FIG. 8, a section of the on-board-device bracket 10 to which the video camera 2 is mounted is illustrated.

As illustrated in FIG. 2, the rain sensor 4 is mounted to the detection-means mount portion 22 while the video camera 2 is mounted to the camera mount portion 18. The video camera 2 is held between the plate spring portion 20 and a plurality of the support portions 21. As illustrated in FIG. 8, the camera lens 3 is disposed at the lens opening portion 19 in a state of being inserted into the communication port portion 27 of the front portion 16 through the lens opening portion 19. In this state, the front portion 16 is disposed on the front side of the camera lens 3, and this front portion 16 forms a gap between the windshield 1 and the gap formation plate 28. The gap is gradually narrowed from the communication port portion 27 toward the front end of the front portion 16. The bracket body portion 11 is attached at the body bonding portions 12 to the windshield 1 with a bonding means (not illustrated), such as an adhesive or a double-sided tape, while the front portion 16 is attached at the front bonding portions 30 to the windshield 1 with a bonding means. As illustrated in FIG. 2, the front portion 16 is separated by the slits 17 from the bracket body portion 11, and the front portion 16 is thus bent individually from the bracket body portion 11 and attached to the windshield 1. Note that the on-board-device bracket 10 may be mounted to the windshield 1 in a state in which the video camera 2 and the rain sensor 4 are mounted. Alternatively, the video camera 2 and the rain sensor 4 may be mounted to the on-board-device bracket 10 after the on-board-device bracket 10 is mounted to the windshield 1.

Next, effects of the present embodiment will be described.

As described above, in the present embodiment, the plate-shaped on-board-device bracket 10 is formed by the bracket body portion 11 and the front portion 16 connected to the front part of the center portion 13 of the bracket body portion 11, and the slits 17 along the front portion 16 are formed between the front portion 16 and the bracket body portion 11 (refer to FIG. 2). The on-board-device bracket 10 is made of a resin, and thus, the front portion 16 is bent by the slits 17 individually from the bracket body portion 11 and displaced with respect to the windshield 1. With this configuration, the front portion 16 is partially separated from the bracket body portion 11 by the slits 17 and is bent with respect to the windshield 1, when to be bonded to the windshield 1, independently from the bending of the bracket body portion 11 with respect to the windshield 1. That is, the front portion 16 is bent without depending on the bending of the bracket body portion 11 and thus can flexibly respond to inappropriate factors.

Figure 3:
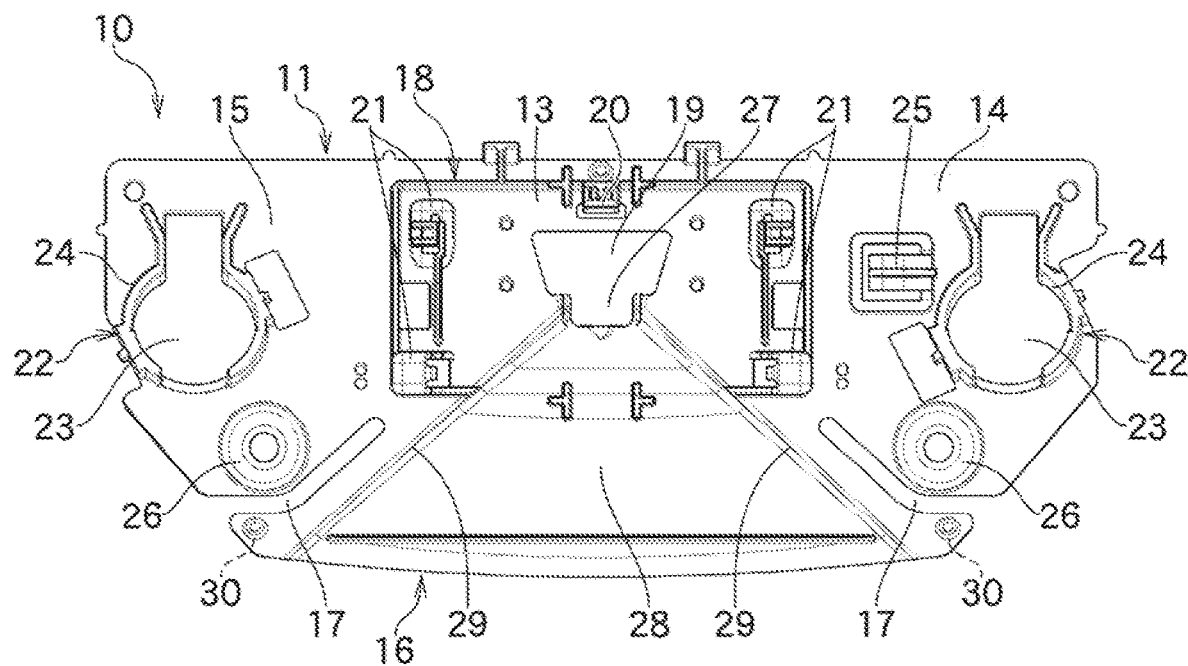
FIG. 3 is a view showing a face of the on-board-device bracket according to an embodiment of the present invention.
Figure 4:
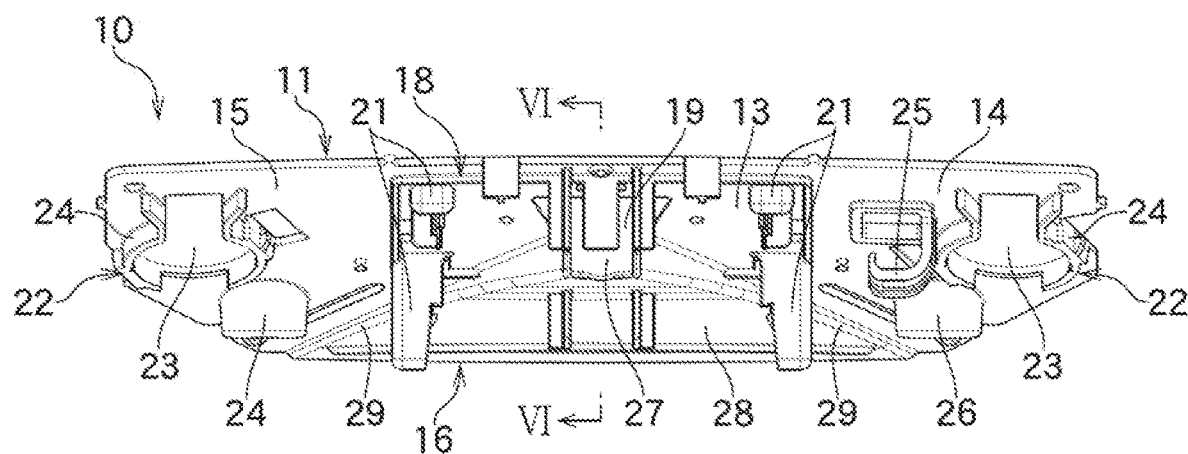
FIG. 4 is a back view of the on-board-device bracket according to an embodiment of the present invention.
Figure 5:
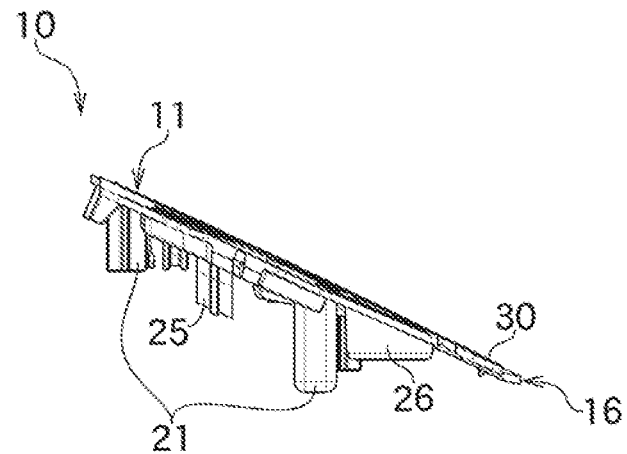
FIG. 5 is a side view of the on-board-device bracket according to an embodiment of the present invention.
Figure 6:
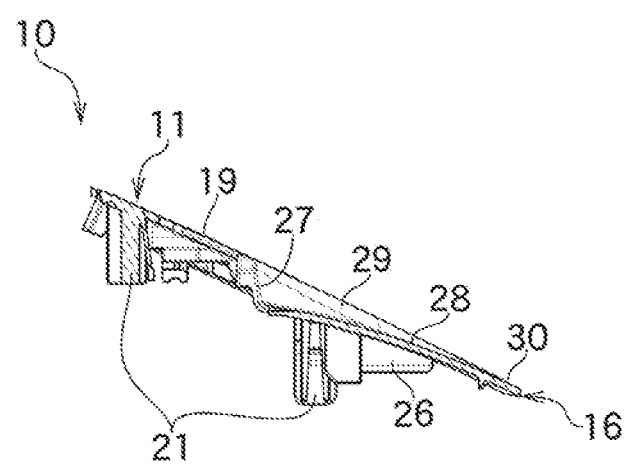
FIG. 6 is a section taken along line VI-VI of FIG. 4 and is a side sectional view of the on-board-device bracket according to an embodiment of the present invention.
Figure 7:
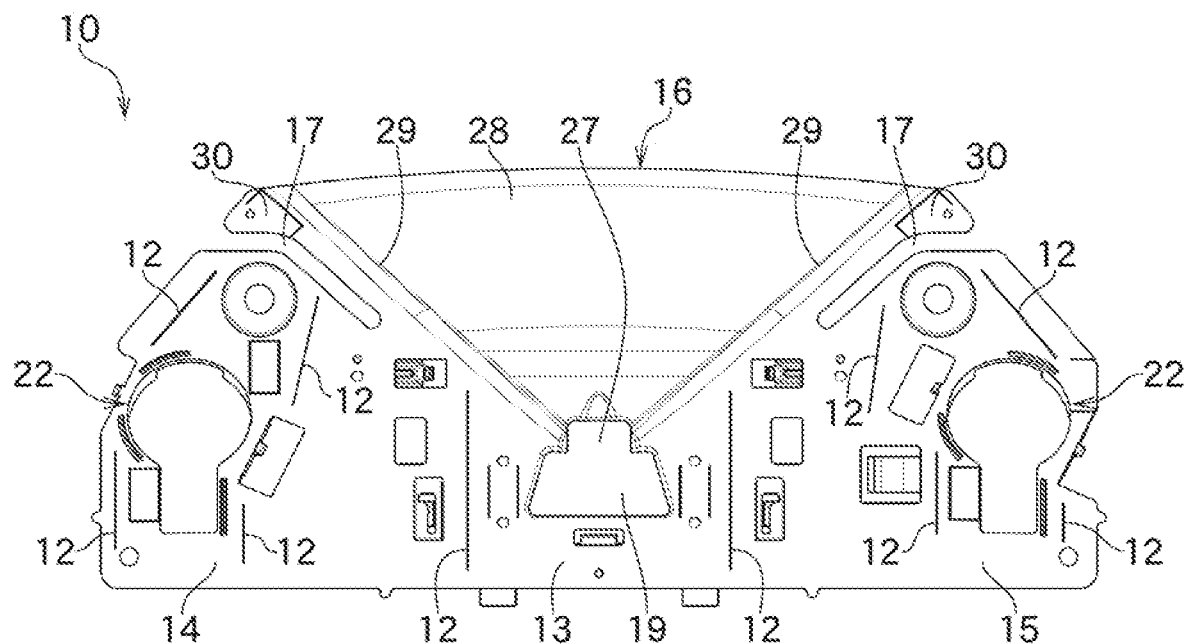
FIG. 7 is a view showing a reverse surface of the on-board-device bracket according to an embodiment of the present invention.

In addition, the front portion 16 has a triangular shape or a fan shape gradually extending to the left and the right from the center portion 13 toward the front side and includes the front bonding portions 30 at left and right both ends of the front end (refer to FIG. 3). With this configuration, the front portion 16 is bonded to the windshield 1 separately from the bonding of the bracket body portion 11 to the windshield 1. Consequently, it is possible to appropriately mount the front portion 16 with respect to the windshield 1 without depending on the bracket body portion 11.

In addition, since the slits 17 are formed to be a left-right pair, the front portion 16 is reliably separated with respect to the bracket body portion 11 even if the bracket body portion 11 is large. Consequently, it is possible to reliably and appropriately mount the front portion 16 with respect to the windshield 1.

In the present embodiment, the cover mount portion 26 to which the cover 5 is to be mounted is formed at each of the left and right portions 14 and 15, and the cover mount portions 26 and the front bonding portions 30 of the front portion 16 are separated from each other with the slits 17 interposed therebetween (refer to FIG. 3). With this configuration, the cover 5 is mounted to the bracket body portion 11 and is not mounted to the front portion 16. That is, the front portion 16 is independent not only from the bracket body portion 11 but also from the cover 5. The front portion 16 is thus bent without depending on the bending of the bracket body portion 11 even when covered by the cover 5. Consequently, it is possible to appropriately mount the front portion 16 with respect to the windshield 1. In other words, the bracket body portion 11 is also bent without depending on the bending of the front portion 16, and it is thus possible to appropriately mount the bracket body portion 11 with respect to the windshield 1. When the orientation of the bracket body portion 11 is appropriate, the orientation of the cover 5 mounted thereto is also appropriate. Consequently, the camera lens 3 is appropriately covered by the cover 5, and it is possible to suppress the influence of reflection and the like with respect to the camera lens 3.

In the present embodiment, the cover mount portion 26 and the slits 17 are substantially left-right symmetrical with respect to the center line in the on-board-device bracket 10 (Refer to FIG. 3). Consequently, it is possible to bend the front portion 16 independently from the bracket body portion 11 and appropriately mount the front portion 16 with respect to the windshield 1.

In the present embodiment, the camera mount portion 18 to which the video camera 2 is to be mounted is formed at the center portion 13 of the bracket body portion 11, and the detection-means mount portion 22 to which the rain sensor 4 is to be mounted is formed at each of the left and right portions 14 and 15 of the bracket body portion 11 (refer to FIG. 3). Consequently, on-board devices of a plurality of types are supported by the bracket body portion 11 in common, and it is possible to mount the on-board devices of the plurality of types to the windshield 1 with the single member.

In particular, since the plate spring portion 20 that supports the video camera 2 is formed at the camera mount portion 18, the video camera 2 can be fastened, regardless of inappropriate factors, as a result of the video camera 2 being pressed by the plate spring portion 20.

In another embodiment according to the present invention, the relative displacement means may be a thin portion connected to the bracket body portion and the front portion as long as the bracket body portion and the front portion are bent independently and displaced with respect to the windshield. In another embodiment, the center portion, the camera mount portion, the cover mount portion, the front portion, or the slits are not left-right symmetrical with respect to the center line. In another embodiment, the cover mount portion is also formed at the front portion.

Embodiments of the present invention have been described above in detail. The present invention is, however, not limited to the aforementioned embodiments. In the present invention, various design changes can be performed as long as not departing from the matters described in the claims.

What is claimed is:

1. An on-board-device bracket for installing an on-board device at a windshield of an automobile, the on-board-device bracket comprising:
   a bracket body portion including a body bonding portion that is to be bonded to the windshield; and
   a front portion that is connected to the bracket body portion and that is disposed on a front side of an imaging means that is the on-board device, the front side being a direction toward the windshield as viewed from a vehicle interior,
   wherein a relative displacement means that displaces the front portion individually from the bracket body portion is formed along the front portion from a front end of the front portion, the front end being disposed on a front side of a lens opening portion at which a camera lens is to be disposed, and the front end including a front bonding portion that is to be bonded to the windshield.

2. The on-board-device bracket according to claim 1, wherein the relative displacement means is a slit formed toward the lens opening portion.

3. The on-board-device bracket according to claim 2, wherein the relative displacement means is disposed on left and right sides of the front portion.

4. The on-board-device bracket according to claim 3, wherein a cover mount portion to which a cover that covers the on-board device is to be mounted is formed at the bracket body portion.

5. The on-board-device bracket according to claim 4, wherein the relative displacement means is formed left-right symmetrically, and
wherein the cover mount portion is formed left-right symmetrically.

6. The on-board-device bracket according to claim 2, wherein a cover mount portion to which a cover that covers the on-board device is to be mounted is formed at the bracket body portion.

7. The on-board-device bracket according to claim 6, wherein the relative displacement means is formed left-right symmetrically, and
wherein the cover mount portion is formed left-right symmetrically.

8. The on-board-device bracket according to claim 1, wherein the relative displacement means is disposed on left and right sides of the front portion.

9. The on-board-device bracket according to claim 8, wherein a cover mount portion to which a cover that covers the on-board device is to be mounted is formed at the bracket body portion.

10. The on-board-device bracket according to claim 9, wherein the relative displacement means is formed left-right symmetrically, and
wherein the cover mount portion is formed left-right symmetrically.

11. The on-board-device bracket according to claim 1, wherein a cover mount portion to which a cover that covers the on-board device is to be mounted is formed at the bracket body portion.

12. The on-board-device bracket according to claim 11, wherein the relative displacement means is formed left-right symmetrically, and
wherein the cover mount portion is formed left-right symmetrically.

13. The on-board-device bracket according to claim 1, wherein the on-board-device bracket has a plate shape, wherein, at the bracket body portion, a camera mount portion to which a video camera that is the imaging means is to be mounted, a detection-means mount portion disposed on left and right sides of the camera mount portion and to which an environment detection means that is the on-board device is to be mounted, and a cover mount portion disposed near the detection-means mount portion and to which a cover that covers the on-board device is to be mounted are formed, wherein the front portion is connected to a front part of the bracket body portion, is formed in a concave shape that provides a gap between the front portion and the windshield, and has the front bonding portion at left and right both ends of the front end, and wherein the relative displacement means is formed between the front bonding portion and the cover mount portion to extend from the front end toward the camera mount portion.

14. The on-board-device bracket according to claim 13, wherein the relative displacement means is a slit.

15. The on-board-device bracket according to claim 14, wherein the relative displacement means is disposed on left and right sides of the front portion.

16. The on-board-device bracket according to claim 13, wherein the relative displacement means is disposed on left and right sides of the front portion.

* * * * *